(12) United States Patent
Bytnar et al.

(10) Patent No.: US 10,395,465 B2
(45) Date of Patent: Aug. 27, 2019

(54) PERSISTENT DEVICE RELATIONSHIPS IN WAGERING GAME SYSTEMS

(75) Inventors: Michael R. Bytnar, Naperville, IL (US); Mark B. Gagner, West Chicago, IL (US); Timothy C. Loose, Chicago, IL (US); Larry J. Pacey, Northbrook, IL (US); Scott H. Schulhof, Chicago, IL (US)

(73) Assignee: BALLY GAMING, INC., Las Vegas, NV (US)

( * ) Notice: Subject to any disclaimer, the term of this patent is extended or adjusted under 35 U.S.C. 154(b) by 677 days.

(21) Appl. No.: 12/918,066

(22) PCT Filed: Feb. 26, 2009

(86) PCT No.: PCT/US2009/035355
§ 371 (c)(1),
(2), (4) Date: Aug. 18, 2010

(87) PCT Pub. No.: WO2009/108820
PCT Pub. Date: Sep. 3, 2009

(65) Prior Publication Data
US 2010/0331079 A1 Dec. 30, 2010

Related U.S. Application Data

(60) Provisional application No. 61/031,923, filed on Feb. 27, 2008.

(51) Int. Cl.
*G07F 17/32* (2006.01)
*H04W 12/06* (2009.01)
*H04L 29/06* (2006.01)

(52) U.S. Cl.
CPC .......... *G07F 17/32* (2013.01); *G07F 17/3218* (2013.01); *G07F 17/3223* (2013.01); *H04L 67/38* (2013.01); *H04W 12/06* (2013.01)

(58) Field of Classification Search
CPC ............................... H04L 67/38; H04W 12/06
(Continued)

(56) References Cited

U.S. PATENT DOCUMENTS 8,095,977 B2 * 1/2012 Mullor .................... G06F 21/31
713/184
2005/0054438 A1 3/2005 Rothschild et al.
(Continued)

FOREIGN PATENT DOCUMENTS

GB           2472925        2/2011
WO    WO-2009108820         9/2009

OTHER PUBLICATIONS

"Bluetooth—Wikipedia, the free encyclopedia", Jan. 2008 , 1-20 pages.
(Continued)

*Primary Examiner* — Robert R Niquette
(74) *Attorney, Agent, or Firm* — DeLizio Law, PLLC

(57) ABSTRACT

In some embodiments a wagering game system comprises a personal area network device configured to render media content including results of a wagering game. The system can include a wagering game machine configured to determine and provide the wagering game results to the personal area network device. The wagering game machine can include a personal area network device transceiver configured to exchange data with the personal area network device, the data including the wagering game results, and a personal area network controller configured to detect the personal area network device, to procure an identification code for the personal area network device without player input, and to authenticate the personal area network device by use of the identification code. The system can also include a repository configured to store the identification code in association with (Continued)

a player identifier and to provide the identification code to the wagering game machine upon request.

15 Claims, 7 Drawing Sheets

(58) Field of Classification Search
USPC .................................................. 705/35–45
See application file for complete search history.

(56) References Cited

U.S. PATENT DOCUMENTS

| | | | |
|---|---|---|---|
| 2006/0058102 A1* | 3/2006 | Nguyen | G07F 17/3223 463/39 |
| 2006/0189382 A1* | 8/2006 | Muir | G07F 17/32 463/29 |
| 2006/0252530 A1 | 11/2006 | Oberberger et al. | |
| 2008/0076525 A1* | 3/2008 | Kim | G07C 15/006 463/22 |
| 2008/0076572 A1* | 3/2008 | Nguyen | G07F 17/32 463/42 |
| 2008/0134237 A1* | 6/2008 | Tu | H04N 5/44543 725/38 |
| 2008/0224822 A1* | 9/2008 | Gelman | G07C 9/00103 340/5.2 |
| 2008/0248865 A1* | 10/2008 | Tedesco | G07F 17/3248 463/25 |
| 2009/0069090 A1* | 3/2009 | Moser | G07F 17/3239 463/42 |
| 2009/0093300 A1* | 4/2009 | Lutnick | G07F 17/32 463/26 |
| 2009/0153342 A1* | 6/2009 | Thorn | G06F 1/1626 340/669 |

OTHER PUBLICATIONS

"PCT Application No. PCT/US09/35355 International Preliminary Examination Report", dated Feb. 3, 2010, 13 pages.
"PCT Application No. PCT/US09/35355 International Search Report", dated Apr. 29, 2009, 8 pages.
"UK Application No. 1016241.0 Office Action", dated Dec. 30, 2011, 4 pages.
"AU Application No. 2009219246 Examiners Report", dated Apr. 8, 2013, 4 pages.
"AU Application No. 2009219246 Examination Report", dated Apr. 7, 2014, 4 pages.
"Australian Patent Application No. 2015200013 Patent Examination Report", dated Feb. 18, 2016, 4 pages.

* cited by examiner

PERSISTENT DEVICE RELATIONSHIPS IN WAGERING GAME SYSTEMS

RELATED APPLICATIONS

This application claims the priority benefit of U.S. Provisional Application Ser. No. 61/031,923 filed Feb. 27, 2008.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2009, WMS Gaming, Inc.

FIELD

Embodiments of the inventive subject matter relate generally to wagering game systems, and more particularly to pairing personal area network devices in a wagering game environment.

BACKGROUND

Wagering game machines, such as slot machines, video poker machines and the like, have been a cornerstone of the gaming industry for several years. Generally, the popularity of such machines depends on the likelihood (or perceived likelihood) of winning money at the machine and the intrinsic entertainment value of the machine relative to other available gaming options. Where the available gaming options include a number of competing wagering game machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for wagering game machine manufacturers to continuously develop new games and gaming enhancements that will attract frequent play.

SUMMARY

Some embodiments describe a method for pairing a wagering game machine with a Bluetooth™ enabled device, the method comprises receiving, at the wagering game machine, a player identifier; detecting, at the wagering game machine, a Bluetooth enabled device; using the player identifier to procure an identification code associated with the Bluetooth enabled device, wherein the procurement occurs without player input; authenticating the Bluetooth enabled device using the identification code; presenting results of a wagering game on the wagering game machine; and transmitting media content representing the results to the Bluetooth enabled device.

In some embodiments, the procurement of the player identifier also occurs without input from the Bluetooth enabled device.

In some embodiments, the identification code is procured from a repository remote from the wagering game machine.

In some embodiments, the wagering game further comprises transmitting to the Bluetooth enabled device an award associated with the wagering game, wherein the award includes media content presentable on the personal area network device.

In some embodiments, the authenticating occurs according to the Bluetooth enabled standard.

In some embodiments, the Bluetooth device includes a wireless headset, personal digital assistant, or Nintendo® Wii Remote.

In some embodiments, the method further includes receiving, as player input at another wagering game machine, the identification code; and transmitting the identification code for storage in association with the player identifier.

In some embodiments, the wagering game machine receives the player identifier from the Bluetooth enabled device.

In some embodiments, a wagering game system comprises a personal area network device configured to render media content including results of a wagering game; a wagering game machine configured to determine and provide the wagering game results to the personal area network device, the wagering game machine includes, a personal area network device transceiver configured to exchange data with the personal area network device, the data includes the wagering game results; and a personal area network controller configured to detect the personal area network device, to procure an identification code for the personal area network device without player input, and to authenticate the personal area network device by use of the identification code; a repository configured to store the identification code in association with a player identifier and to provide the identification code to the wagering game machine upon request.

In some embodiments, the personal area network device includes a wireless headset, personal digital assistant, or Nintendo Wii Remote, In some embodiments, the personal area network device communicates according to a Bluetooth™ standard.

In some embodiments, the repository resides on another wagering game machine.

In some embodiments, the repository resides in a player account server.

In some embodiments, the personal area network device includes a Nintendo Wii Remote and a biometric reader.

In some embodiments, the repository is further configured to store other identification codes in association with other player identifiers and to provide the other identification codes upon request.

Some embodiments include one or more machine-readable media including instructions executable by a machine, the instructions includes instructions for receiving, at a first wagering game machine, a player identifier; instructions for detecting, at the first wagering game machine, a personal area network device; instructions for receiving, at the first wagering game machine, player input including an identification code associated with the personal area network device; instructions for authenticating, at the first wagering game machine, the personal area network device using the identification code; instructions for storing the identification code in association with the player identifier and a device identifier associated with the personal area network (PAN) device; instructions for presenting, at the first wagering game machine, results of a first wagering game; instructions for receiving, at a second wagering game machine, the identification code, wherein the receipt of the identification code occurs without player input; instructions for detecting, at the second wagering game machine, the PAN device;

instructions for using the identification code, at the second wagering game machine, to authenticate the PAN device; and instructions for presenting, at the second wagering game machine, results of a second wagering game.

In some embodiments, the personal area network device communicates according to a Bluetooth™ standard.

In some embodiments, the personal area network device includes a wireless headset, personal digital assistant, or Nintendo Wii Remote.

In some embodiments, the one or more machine-readable media wherein the instructions further comprise instructions for transmitting the results of a first wagering game to the personal area network device; and instructions for transmitting the results of a second wagering game to the personal area network device.

In some embodiments, the one or more machine-readable media wherein the instructions further comprises instructions for transmitting to the personal area network device media content including a hint, wherein the hint reveals information that increases odds of winning a future wagering game.

In some embodiments, a wagering game machine capable of pairing with a Bluetooth enabled device, the wagering game machine comprises means for receiving, at the wagering game machine, a player identifier; means for detecting, at the wagering game machine, a Bluetooth enabled device; means for using the player identifier to procure an identification code associated with the Bluetooth enabled device, wherein the procurement occurs without player input; means for authenticating the Bluetooth enabled device using the identification code; means for presenting results of a wagering game on the wagering game machine; and means for transmitting media content representing the results to the Bluetooth enabled device.

In some embodiments, the procurement of the player identifier also occurs without input from the Bluetooth enabled device.

In some embodiments, the identification code is procured from a repository remote from the wagering game machine.

In some embodiments, the wagering game machine further comprises means for transmitting to the Bluetooth enabled device an award associated with the wagering game, wherein the award includes media content presentable on the personal area network device.

In some embodiments, the authenticating occurs according to the Bluetooth enabled standard.

BRIEF DESCRIPTION OF THE FIGURES

Embodiments of the invention are illustrated in the Figures of the accompanying drawings in which.

DESCRIPTION OF THE EMBODIMENTS

This description of the embodiments is divided into five sections. The first section provides an introduction to embodiments of the invention, while the second section describes example wagering game machine architectures. The third section describes example operations performed by some embodiments and the fourth section describes example wagering game machines in more detail. The fifth section presents some general comments.

Introduction

This section provides an introduction to some embodiments of the invention.

Wagering game systems can include personal area networking (PAN) technologies (e.g., Bluetooth™, IrDA®, ZigBee, Ultra-wideband, etc.) that enhance gaming experiences. Some PAN technologies allow players to provide input and receive output using wireless devices. For example, PAN devices can enable players to receive audio via wireless headphones, provide input via wireless input devices (e.g., Nintendo Wii), receive content on personal digital assistants or smartphones, provide speech input via wireless microphone, etc.

Figure 1:
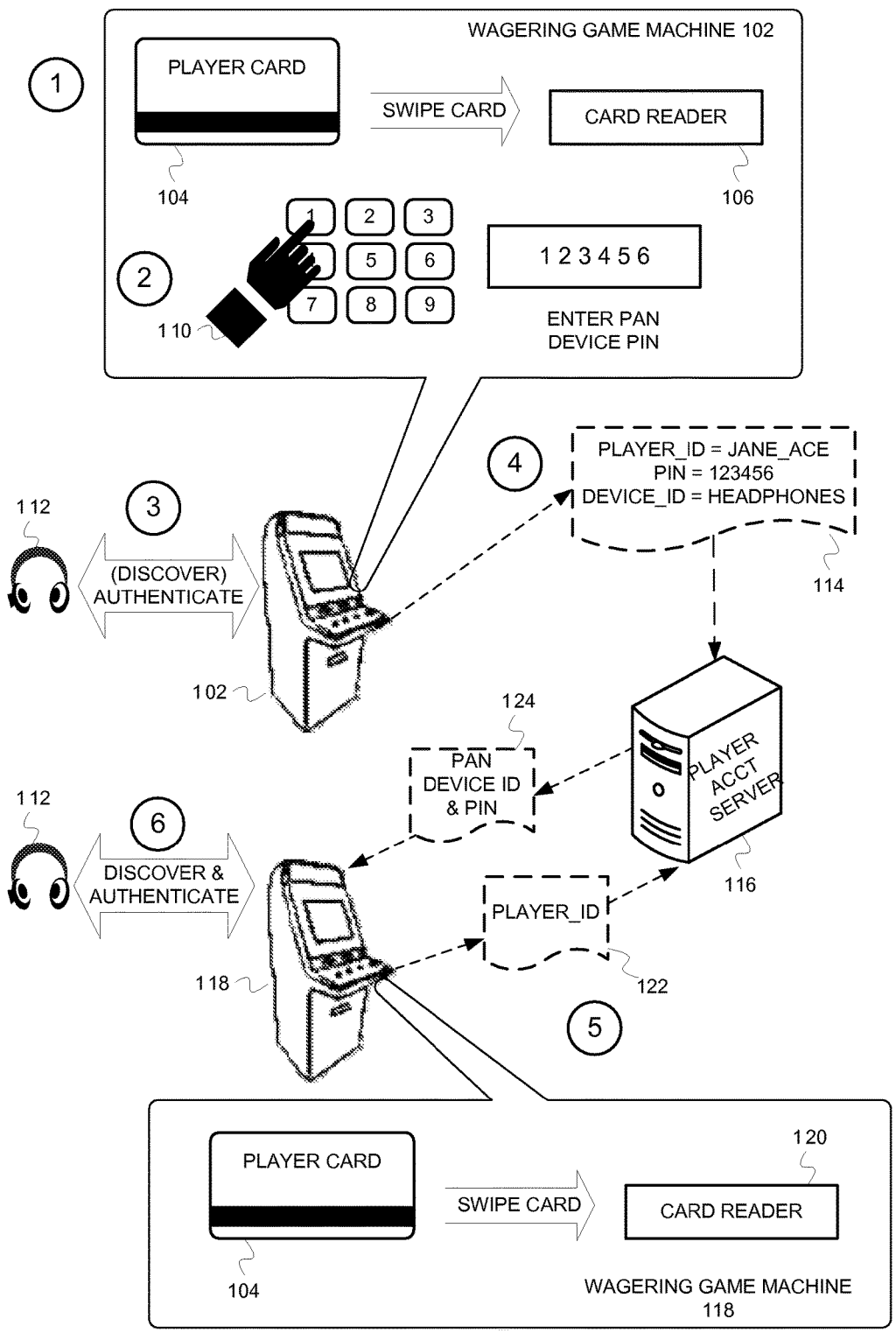
FIG. 1 is a conceptual diagram illustrating how a wagering game system can persistently store and reuse PAN device PINs, according to some embodiments of the invention.

To establish secure communications, PAN devices and wagering game machines may perform operations for "pairing." Pairing is a process in which a wagering game machine authenticates a PAN device using a secret shared between the devices. In some instances, a player enters a secret, such as a personal identification number (PIN) or other authentication code including any suitable indicia such as letters and numbers, into a wagering game machine and a PAN device. The wagering game machine and PAN device can use the PIN to create encryption keys which they can use for authentication and establishing encrypted communications. After a player initially provides a PAN device's PIN, some embodiments enable the player to use the PAN device with any other wagering game network device (e.g., other wagering game machines) without the player again providing the PAN device's PIN. FIG. 1 describes these concepts in more detail.

FIG. 1 is a conceptual diagram illustrating how a wagering game system can persistently store and reuse PAN device PINs, according to some embodiments of the invention. In FIG. 1, six stages show how a wagering game system 100 stores and reuses PAN device PINs. In FIG. 1, the wagering game system 100 includes two wagering game machines 102 & 118 and an account server 116.

During stage one, a player initiates a wagering game session on a wagering game machine 102 by swiping a player card 104 through a card reader 106. Swiping the player card 104 provides the player's player identifier to the wagering game machine 102. The wagering game machine may also ask the player to enter a password (or other secret), so it can authenticate the player. During stage two, the wagering game machine 102 looks for PAN devices with which it can pair. After recognizing the PAN device 102, the wagering game machine 102 prompts the player 110 to enter a PIN associated with the PAN device 102. As shown, the PAN device 112 can be wireless headphones or any other suitable device, such as a PDA, media player, remote control, etc.

During stage three, the wagering game machine 102 establishes communications with the PAN device 112 and uses the PIN to authenticate the PAN device 112. After authentication, the device 112 and machine 102 can securely communicate using encrypted communications. The wagering game machine 102 can present content and game results on its own components, while also sending content and game results (e.g., a game's audio content) for presentation on the PAN device 112.

During stage four, the wagering game machine 102 transmits the player's identifier, an identifier for the PAN device 112, and the PIN device's PIN to the account server 116 (see 114). The account server 116 can store the PAN device identifier and PIN with the player's account information (e.g., account balance, player preferences, other PAN device PINs, etc.). The PAN device's PIN can be used later when the PAN device 112 pairs with other wagering game machines, as described below.

During stage five, the player initiates a wagering game session with another wagering game machine 118. To initiate the session, the player swipes the player card 104 through the machine's card reader 120, providing the player's player identifier to the wagering game machine 118. After receiving the player identifier, the wagering game machine 118 asks the account server 116 for any PAN device identifiers and PAN device PINS associated with the player identifier (see 124). During stage six, the wagering game machine 102 looks for any PAN devices with which it can pair. Using the PAN device identifier and PIN received from the account server 116, the wagering game machine 118 authenticates the PAN device 112. In turn, the wagering game machine 118 sends wagering game content to the PAN device 112.

Although some of the above-described embodiments pair using PINS, other embodiments uses other techniques. For example, some embodiments can require that secret information (e.g., a private key) be transmitted to one or both devices via a secure means, such as over an encrypted wireless connection or a direct and secure wired connection. In some instances, a separate "configuration device" can provide the secret information to both the PAN device and wagering game machine. Alternatively, a wagering game machine or PAN device can provide the secret information to the other. After the initial transmission of the secret information, the PAN device can pair with other devices without again performing such a transmission.

In addition to further describing the concepts noted above, the following discussion describes how some embodiments utilize PAN devices to facilitate various wagering game features. The following discussion describes embodiments that use a PIN for pairing. Those embodiments are not limited to PINS, as they can use any suitable means for representing a shared secret.

Operating Environment

This section describes an example operating environment and presents structural aspects of some embodiments. This section includes discussion about wagering game machine architectures and wagering game networks.

Wagering Game Machine Architectures

Figure 2:
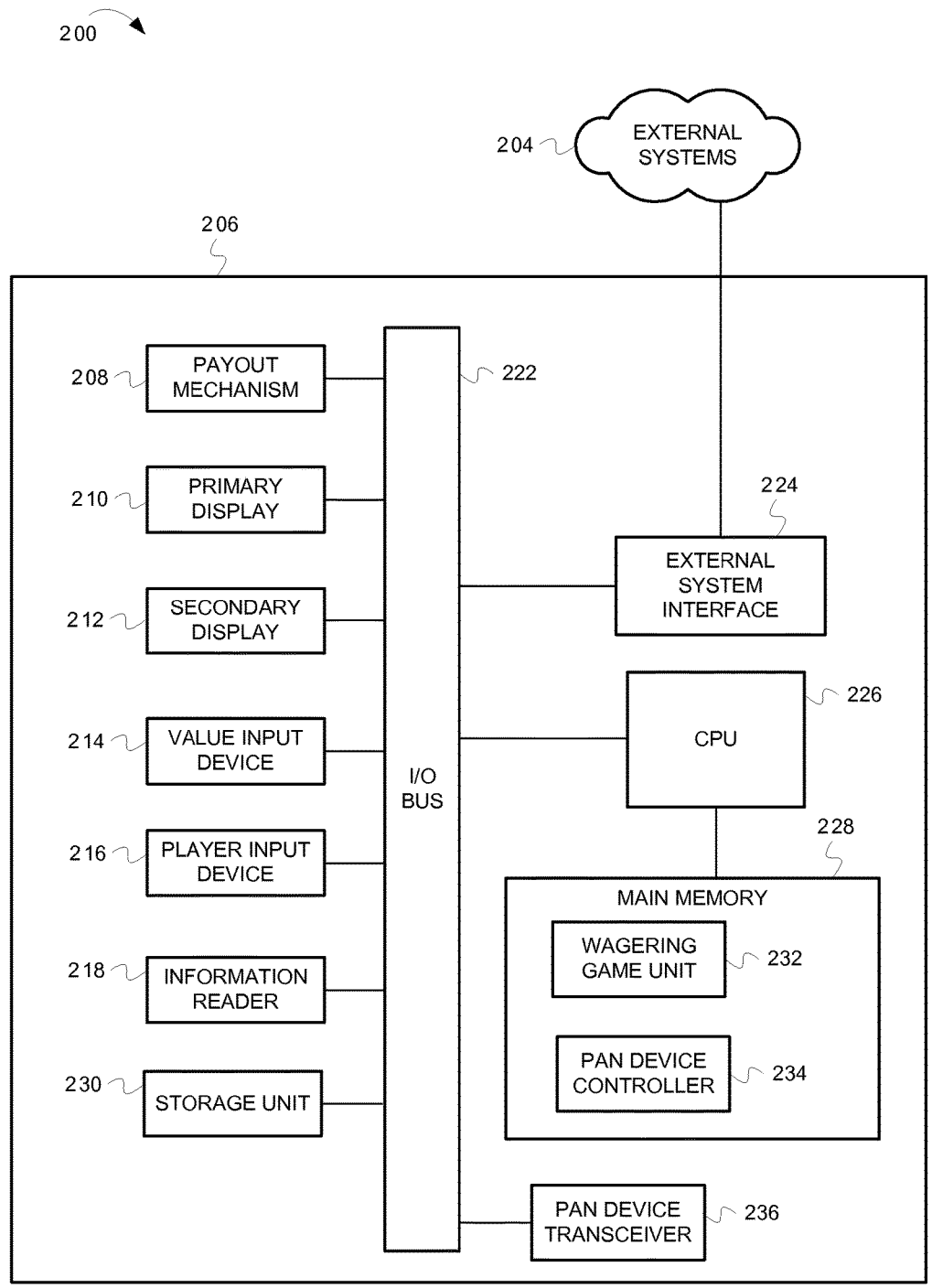
FIG. 2 is a block diagram illustrating a wagering game machine architecture, according to example embodiments of the invention.

FIG. 2 is a block diagram illustrating a wagering game machine architecture, according to example embodiments of the invention. As shown in FIG. 2, the wagering game machine architecture 200 includes a wagering game machine 206, which includes a central processing unit (CPU) 226 connected to main memory 228. The CPU 226 can include any suitable processor, such as an Intel® Pentium processor, Intel® Core 2 Duo processor, AMD Opteron™ processor, or UltraSPARC processor.

The main memory 228 includes a PAN device controller 234. The PAN device controller 234 can establish and control communications with PAN devices, such as PDAs, wireless headphones, remote controls, media players, etc. The PAN controller 234 works in concert with the PAN transceiver 236, which can include logic for communicating according to any suitable PAN technology (e.g., Bluetooth™, IrDA®, ZigBee, Ultra-wideband, etc.). The PAN controller 234 and PAN transceiver 236 can detect and pair with PAN devices. In some instances, the PAN controller 234 requires a PIN for authenticating PAN devices. The PAN controller 234 can acquire the PIN via player input or from a central repository (e.g., an account server). The main memory 228 also includes a wagering game unit 232 that can present wagering games, such as video poker, video black jack, video slots, video lottery, etc., in whole or part. The wagering game unit 232 can use the PAN components for transmitting content to PAN devices. In some instances, the wagering game unit 232 can present wagering games having functionally that requires PAN devices. For example, some wagering games can award MP3s or other content based on game results. For community games, the wagering game unit 232 can send player-specific output (e.g., audio) to a player's PAN device, so others cannot perceive the output.

The CPU 226 is also connected to an input/output (I/O) bus 222, which can include any suitable bus technologies, such as an AGTL+ frontside bus and a PCI backside bus. The I/O bus 222 is connected to a payout mechanism 208, primary display 210, secondary display 212, value input device 214, player input device 216, information reader 218, storage unit 230, and the PAN transceiver 236. The player input device 216 can include the value input device 214 to the extent the player input device 216 is used to place wagers. The I/O bus 222 is also connected to an external system interface 224, which is connected to external systems 204 (e.g., wagering game networks).

In one embodiment, the wagering game machine 206 can include additional peripheral devices and/or more than one of each component shown in FIG. 2. For example, in one embodiment, the wagering game machine 206 can include multiple external system interfaces 224 and/or multiple CPUs 226. In one embodiment, any of the components can be integrated or subdivided.

Any of the components of the architecture 200 can be integrated or subdivided. Also, any of the components can include hardware, firmware, and/or machine-readable media including instructions for performing the operations described herein. Machine-readable media includes any mechanism that provides (i.e., stores and/or transmits) information in a form readable by a machine (e.g., a wagering game machine, computer, etc.). For example, tangible machine-readable media includes read only memory (ROM), random access memory (RAM), magnetic disk storage media, optical storage media, flash memory machines, etc. Machine-readable media also includes any media suitable for transmitting software over a network.

While FIG. 2 describes an example wagering game machine architecture, this section continues with a discussion wagering game networks.

Wagering Game Networks

Figure 3:
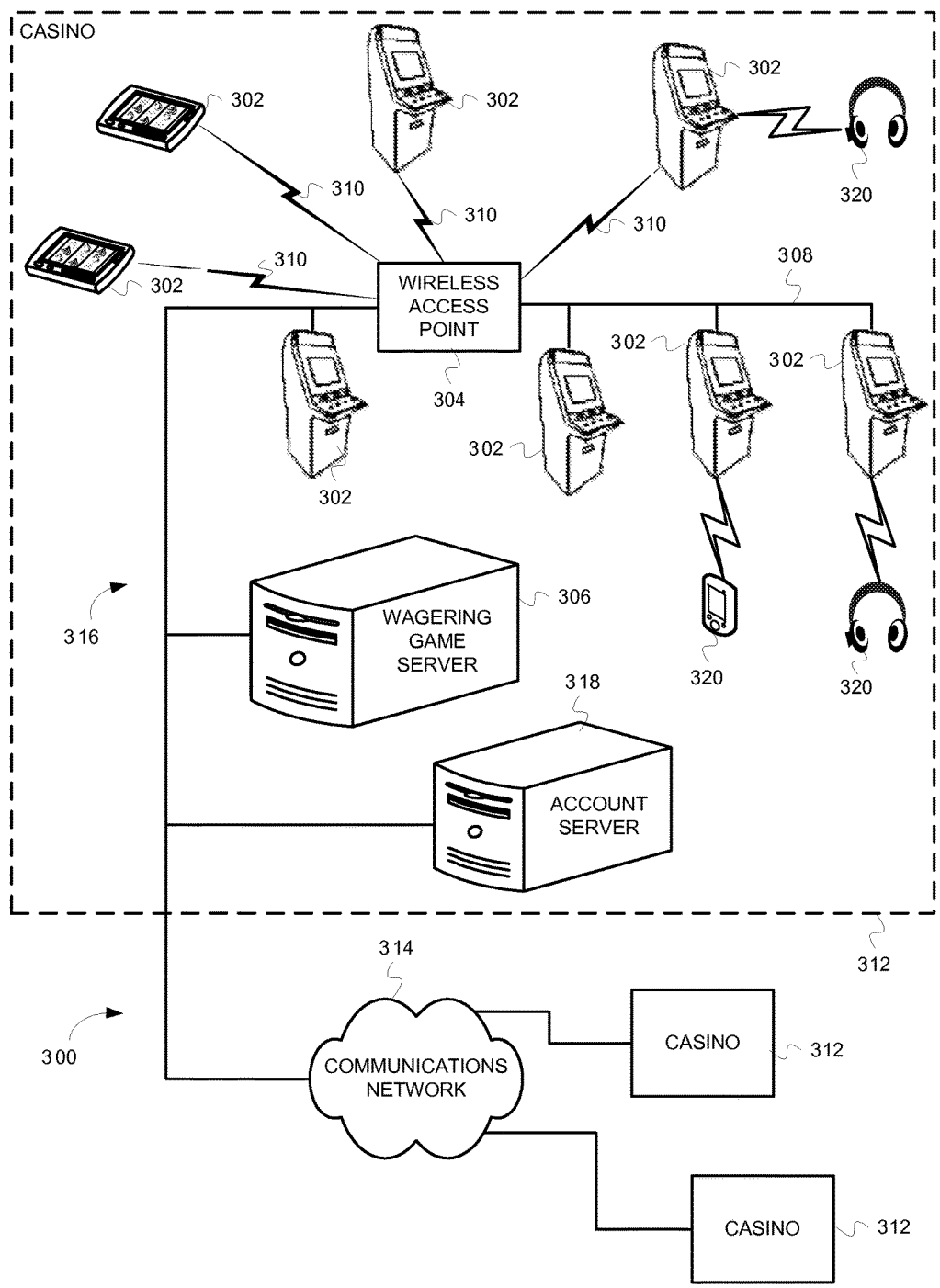
FIG. 3 is a block diagram illustrating a wagering game network 200, according to example embodiments of the invention.

FIG. 3 is a block diagram illustrating a wagering game network 200, according to example embodiments of the invention. As shown in FIG. 3, the wagering game network 300 includes a plurality of casinos 312 connected to a communications network 314. Each casino 312 includes a local area network 316, which includes an access point 304, a wagering game server 306, account server 318, PAN devices 320, and wagering game machines 302. The access point 304 provides wireless communication links 310 and wired communication links 308. The wired and wireless communication links can employ any suitable connection technology, such as Bluetooth, 802.11, Ethernet, public switched telephone networks, SONET, etc. In some embodiments, the wagering game server 306 can serve single-player and community wagering games and distribute content to devices located in other casinos 312 or at other locations on the communications network 314.

The PAN devices 320 can include any suitable devices, such as PDAs, wireless headsets, Wii™ Remotes from Nintendo®, wireless mice, wireless joysticks, etc. The PAN devices 320 can also include wired devices (e.g., wired Universal Serial Bus devices). As noted above, the PAN devices 320 can pair with wagering game machines 302 and exchange wagering game content and other information. In some instances, the wagering game machines 302 can act as Internet access points for the PAN devices 320. That is, the wagering game machines 302 can access the Internet via the communications network 314 and exchange Internet content with the PAN devices 320 using PAN technologies.

During the pairing process, the wagering game machines 302 can receive PAN device PINs as player input or the machines 302 can procure PAN device PINs from the account server 318. The account server 318 can store player account information including PAN device PINs, as described herein.

The wagering game machines 302 described herein can take any suitable form, such as floor standing models, handheld mobile units, bartop models, workstation-type console models, etc. Further, the wagering game machines 302 can be primarily dedicated for use in conducting wagering games, or can include non-dedicated devices, such as mobile phones, personal digital assistants, personal computers, etc. In one embodiment, the wagering game network 300 can include other network devices, such as accounting servers, wide area progressive servers, player tracking servers, and/or other devices suitable for use in connection with embodiments of the invention.

In some embodiments, wagering game machines 302 and wagering game servers 306 work together such that a wagering game machine 302 can be operated as a thin, thick, or intermediate client. For example, one or more elements of game play may be controlled by the wagering game machine 302 (client) or the wagering game server 306 (server). Game play elements can include executable game code, lookup tables, configuration files, game outcome, audio or visual representations of the game, game assets or the like. In a thin-client example, the wagering game server 306 can perform functions such as determining game outcome or managing assets, while the wagering game machine 302 can present a graphical representation of such outcome or asset modification to the user (e.g., player). In a thick-client example, the wagering game machines 302 can determine game outcomes and communicate the outcomes to the wagering game server 306 for recording or managing a player's account.

In some embodiments, either the wagering game machines 302 (client) or the wagering game server 306 can provide functionality that is not directly related to game play. For example, account transactions and account rules may be managed centrally (e.g., by the wagering game server 306) or locally (e.g., by the wagering game machine 302). Other functionality not directly related to game play may include power management, presentation of advertising, software or firmware updates, system quality or security checks, etc.

Any of the wagering game network components (e.g., the wagering game machines 302) can include hardware and machine-readable media including instructions for performing the operations described herein.

Example Operations

This section describes operations performed by some embodiments of the inventive subjective matter. In the discussion below, the flow diagrams will be described with reference to the block diagrams presented above. However, in some embodiments, the operations can be performed by logic not described in the block diagrams. In certain embodiments, the operations can be performed by executing instructions residing on machine-readable media (e.g., software), while in other embodiments, the operations can be performed by hardware and/or other logic (e.g., firmware). In some embodiments, the operations can be performed in series, while in other embodiments, one or more of the operations can be performed in parallel. Moreover, some embodiments can perform less than all the operations shown in any flow diagram.

Pairing Pan Devices

Figure 4:
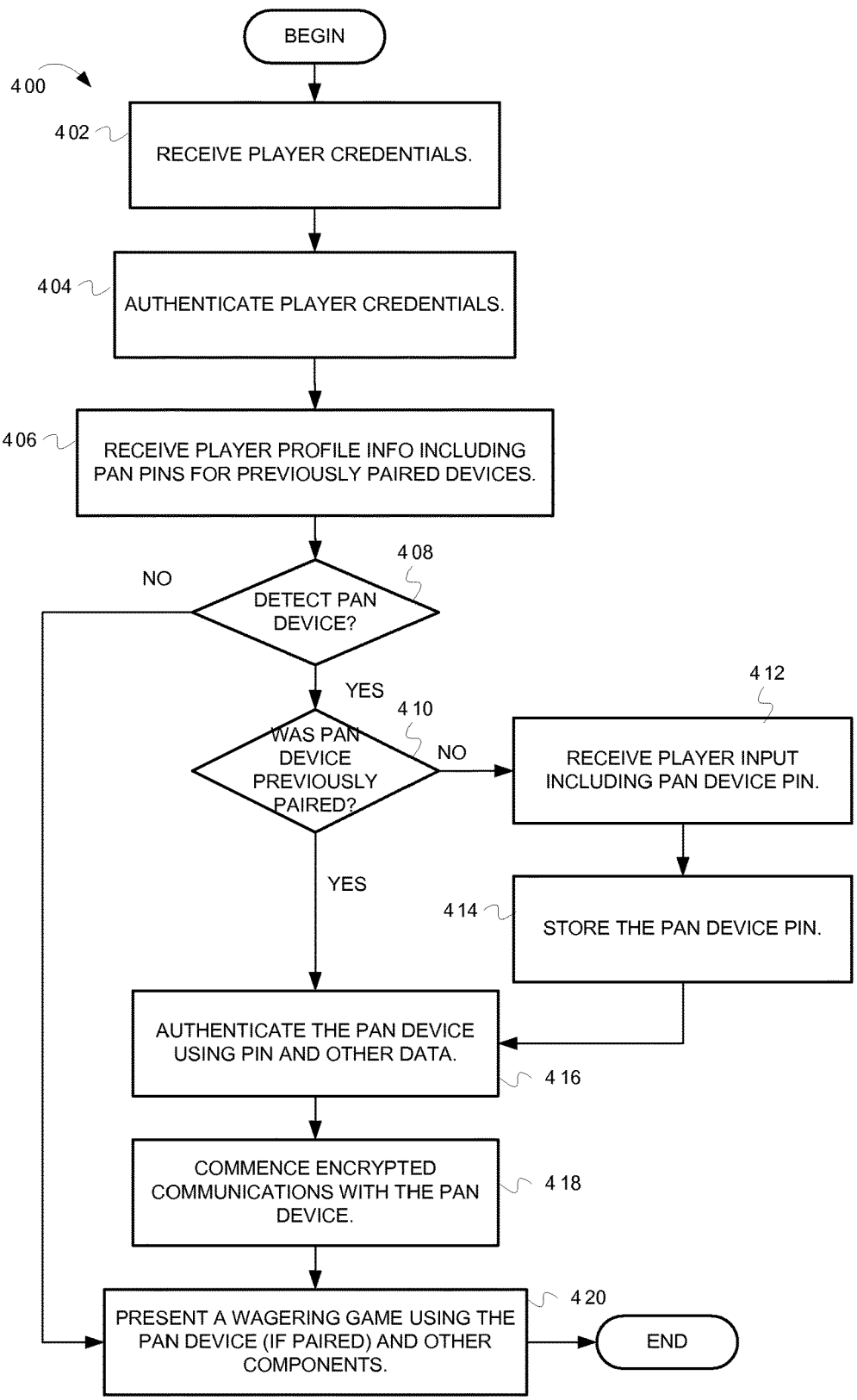
FIG. 4 is a flow diagram illustrating operations for pairing a wagering game machine with a PAN device, according to some embodiments of the invention.

FIG. 4 is a flow diagram illustrating operations for pairing a wagering game machine with a PAN device, according to some embodiments of the invention. In FIG. 4, the flow 400 begins at block 402. At block 402, a wagering game machine receives player credentials, such as by reading a player identifier from a player tracking card. The wagering game machine may require that the player enter a player password, too. The flow continues at block 404.

At block 404, the wagering game machine authenticates the player credentials. For example, the wagering game machine transmits the player credentials to an account server for comparison to stored versions of the credentials. In turn, the account server notifies the wagering game machine that the player credentials are authentic. The flow continues at block 406.

At block 406, the wagering game machine receives profile information associated with the player. The profile information includes one or more PAN device pins. In addition to the PAN device pins, the player profile information can include player preferences, funds, player game histories, etc. As described above, an account server or other repository can store pins for PAN devices that have previously paired with wagering game network devices (e.g., wagering game machines). The flow continues at block 408.

At block 408, the wagering game machine determines whether it detects a PAN device. If the wagering game machine detects a PAN device, the flow continues at block 410. Otherwise, the flow continues at block 420.

At block 410, after detecting a PAN device, the wagering game machine determines whether the PAN device's PIN has been entered into the wagering game system. In making this determination, the wagering game machine can search the player's profile information for a PAN device identifier (e.g., the PAN device's Media Access Control address or other hardware address) identical to that of the detected PAN device. For embodiments in which PAN device PINs are not part of the player's profile information, the wagering game machine can request a particular PAN device's PIN from a central repository or other peer devices. If the PAN device's PIN is not been stored in the wagering game system, the flow continues at block 412. Otherwise, the flow continues at block 416.

At block 412, wagering game machine receives input indicating the PAN device's PIN. The input can be player input representing a PIN (or other secret information). Alternatively, the input can be from another device, such as the PAN device or a configuration device. The flow continues at block 414.

At block 414, the wagering game machine stores the PAN device's PIN. In some embodiments, wagering game machine transmits the PAN device PIN to the account server or other centralized repository for storage. Alternatively, the wagering game machine can store the PAN device PIN locally. The flow continues at block 416.

At block 416, the wagering game machine authenticates a PAN device using the PIN. In some embodiments, the machine authenticates the PAN device using asymmetric encryption based on the PIN. In other embodiments, the wagering game machine can authenticate the PAN device using techniques described in any of the Bluetooth™ specifications. For example, the wagering game machine and PAN device can use the PIN to create authentication keys, and to exchange messages created using one or more of the keys and other data (e.g., addresses, random numbers, etc.). If the machine and device verify the correctness of messages, authentication is successful. The flow continues at block 418.

At block 418, the wagering game machine establishes encrypted communications with the PAN device. The flow continues at block 420.

At block 420, the wagering game machine presents a wagering game using its own components and the PAN device. For example, if the PAN device is a wireless headset, the wagering game machine can transmit the wagering game's audio content to the headset for presentation. From block 420, the flow ends.

Figure 5:
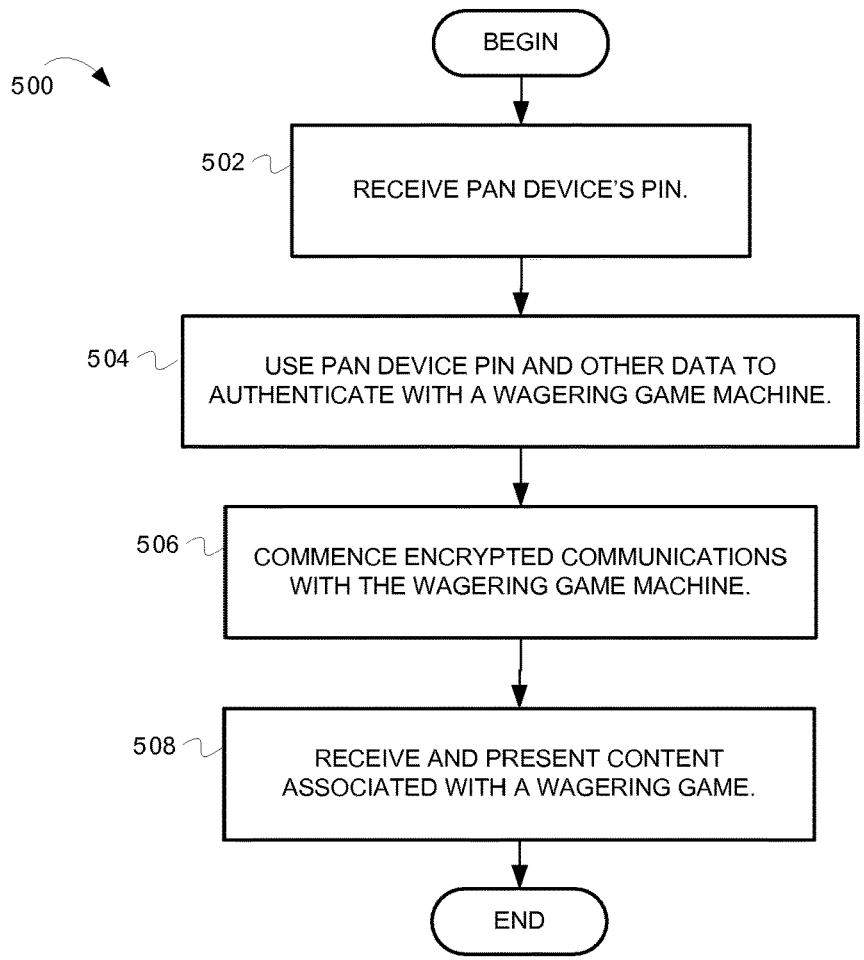
FIG. 5 is a flow diagram illustrating operations for pairing a PAN device to a wagering game machine, according to some embodiments of the invention.

While FIG. 4 describes pairing operations typically performed by wagering game machine, FIG. 5 describes pairing operations of a PAN device.

FIG. 5 is a flow diagram illustrating operations for pairing a PAN device to a wagering game machine, according to some embodiments of the invention. The flow 500 begins at block 502. At block 502, the PAN device receives a PIN. In some instances, a player can enter the PAN device's PIN via a keypad or other input device on the PAN device. In some PAN devices, the PAN device PIN is preset, so players need not enter the PIN (i.e., the PAN device does not perform the operation at block 402). The flow continues at block 504.

At block 504, the PAN device uses the PIN (and possibly other data) to authenticate with a wagering game machine. In some embodiments, the PAN device and a wagering game machine will successfully authenticate if the PAN device's PIN (and possibly other information) matches a PIN received from the wagering game machine. In some embodiments, the PAN device can authenticate with a wagering game machine using techniques described in any of the Bluetooth™ specifications. The flow continues at block 506.

At block 506, the PAN device begins encrypted communications with the wagering game machine. In some embodiments, the encryption scheme is based on the PAN device PIN. The flow continues at block 508.

At block 508, the PAN device receives and presents content associated with a wagering game. In some embodiments, the PAN device receives audio or video content representing results of a wagering game, so a player can perceive the results on the PAN device instead of the wagering game machine. In some embodiments, the PAN device may receive media files or other content as part of an award for a wagering game presented on the wagering game machine. For example, the PAN device may receive a link to a website at which the PAN device can select and download a free media file (e.g., MP3 file). From block 508, the flow ends.

Using Pan Devices Without Player Cards

In some embodiments, PAN devices can perform functions typically performed by player tracking cards. That is, in some instances, PAN devices can electronically provide player credentials to wagering game machines, eliminating the need to insert player cards. In such embodiments, PAN devices can store player credentials, such as user identifiers and the like. After a PAN device has been "paired" with a wagering game machine, a player may end the gaming session, leaving with the device. When the player returns to another wagering game machine (or the same one), the PAN device can electronically provide player credentials (e.g., a user identifier) to the wagering game machine. After receiving the player credentials, the wagering game machine can present a screen showing the credential or a credential identifier, such as an avatar. In turn, the player can select his/her credential to confirm the transaction. The player may then need to enter a password (or other secret) at the wagering game machine. In some instances, the PAN device may transmit the password to the wagering game machine. In such an embodiment, a PAN device (e.g., a mobile phone) can display a message to "Press #1 to confirm login". If the player presses #1 on the PAN device, the PAN device sends the player's password to the wagering game machine. In some instances, the PAN device may require separate player authentication before it will transmit the player's password.

To prevent a multitude of PAN devices from sending player credentials, the wagering game machine can filter out devices not within a specified proximity (e.g. via signal strength or locality mapping to other paired devices). Also, the wagering game machine may filter out (or place lower in the list) devices already paired with neighboring machines outside the wagering game machine's proximity.

In some embodiments, wagering game machines may repeatedly look for PAN devices that will provide player credentials. For example, if a wagering game machine having a zero credit balance suddenly receives money from a player, the machine may repeatedly look for a PAN device from which it can obtain player credentials. Similarly, if a player initiates a "sign-in" (e.g., by pressing a button on the wagering game machine), the machine will repeatedly look for a PAN device with which to pair. In some instances, a player may unexpectedly carry a PAN device out of range, causing the machine to terminate the player's game session. If a PAN moves out of range, the machine may repeatedly attempt to find the device. If the PAN remains out of range and there is value remaining on the wagering game machine (e.g., full or fractional credits), the machine can transfer the money back to the player's account or otherwise reallocate the value.

Community Wagering Games and PAN Devices

Figure 6:
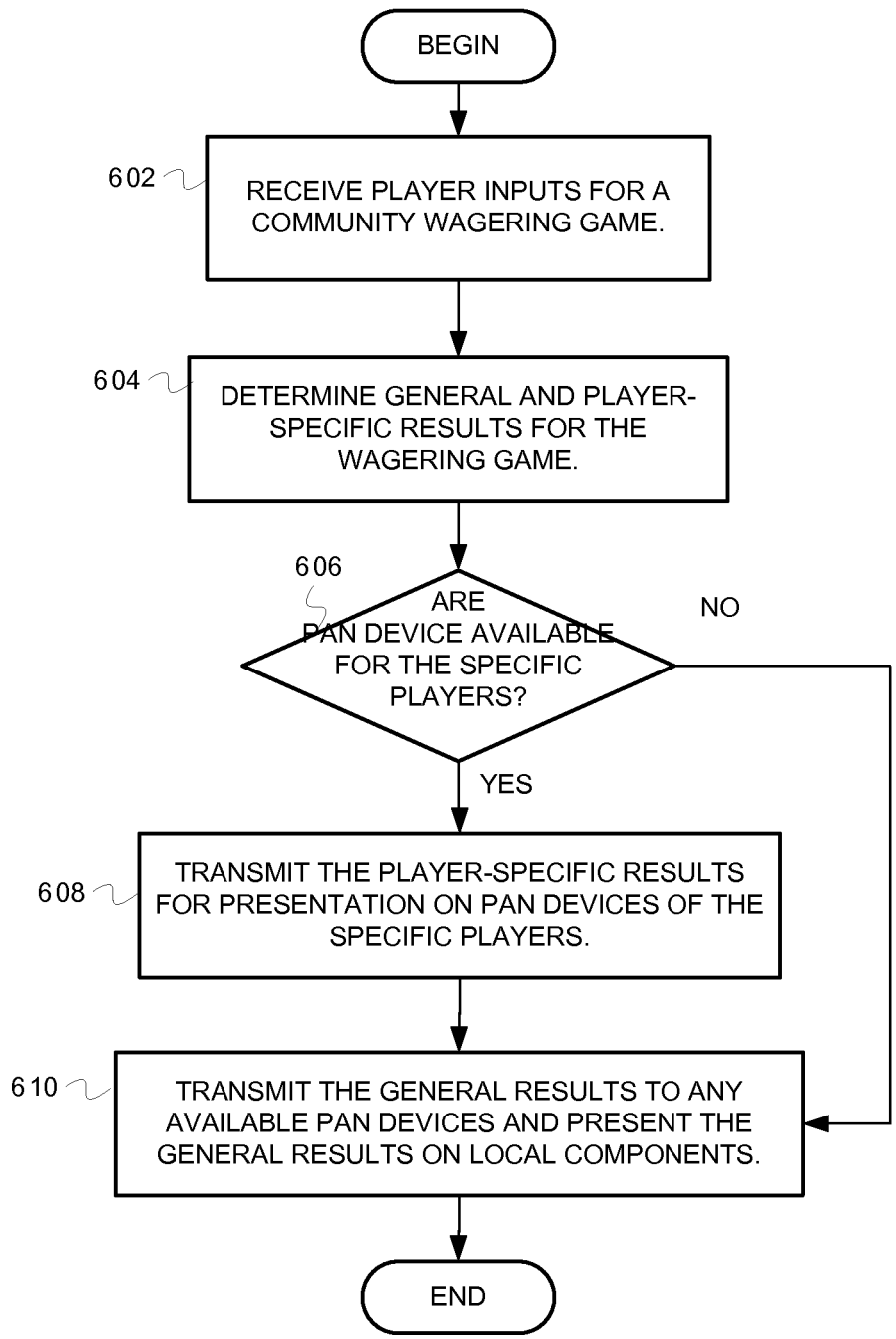
FIG. 6 is a flow diagram illustrating operations for using PAN devices to present community wagering game results, according to some embodiments of the invention.

This section presents embodiments in which community wagering games direct presentation of certain results to PAN devices and other results to wagering game machine components. FIG. 6 describes these embodiments in more detail.

FIG. 6 is a flow diagram illustrating operations for using PAN devices to present community wagering game results, according to some embodiments of the invention. The flow 600 begins at block 602. At block 602, a wagering game system receives player inputs for a community wagering game. A plurality of wagering game machines can receive the player inputs and report them to a wagering game server or other device hosting the community game. The flow continues at block 604.

At block 604, a wagering game server or other host determines community results and player-specific results for the community wagering game. The community results depend on the type of community game. For example, for a community slots game, the community results can include a set of reel positions; for a community Texas Hold 'Em game, the community results can include playing cards, etc. Player-specific results can include audible or visual hints that indicate how to increase a player's odds of winning in future community wagering games. For example, the hint may reveal that certain game pieces (e.g., playing cards, slots reels, etc.) are more likely to appear. The player-specific results can also include other awards, such as music files, video files, photos, etc. The wagering game server can give awards based on player information (e.g., amounts wagered over a given time, time spent in a casino, etc.), casino information (e.g. a casino is offering special awards), or any other suitable information. The flow continues at block 606.

At block 606, the wagering game server determines whether PAN devices are available for players for whom player-specific results were determined. In some embodiments, the wagering game server can poll participating wagering game machines for a list of player identifiers and active PAN devices. Alternatively, participating wagering game machines can report this information before the community wagering game begins. If there are PAN devices available, the flow continues at block 608. Otherwise, the flow continues at block 610.

At block 608, the wagering game server transmits the player-specific results for presentation on PAN devices. In some embodiments, the wagering game server can transmit content representing the player-specific results to wagering game machines paired with the relevant PAN devices. In turn, the wagering game machines can forward the results to the PAN devices. For example, if the player-specific results for a particular player include an audible hint, the wagering game server can transmit media content to a wagering game machine at which the player swiped a player card. In turn, the wagering game machine can forward the media content to a PAN device, which can reveal the hint by rendering the media content. In some instances, the wagering game server can select the content for representing the hint or other award based on the type of PAN device associated with the player. For example, if the PAN device is a headset, the hint will be included in an audio file. If the PAN device is a PDA, the hint can be included in a text file. Because a PAN device (e.g., a wireless headset, PDA, etc.) reveals the hint, it is more likely that only the player will perceive the hint. The flow continues at block 610.

At block 610, the wagering game server transmits the general results for presentation on the wagering game machines and other publicly perceptible devices (e.g., a video display specifically for the community game). Additionally, the server also transmits the general results addressed to any available PAN devices. As a result, players can view the general results on the wagering game machines and any available PAN devices. From block 610, the flow ends.

While the discussion above indicates that wagering game machines (or other devices) transmit content to the PAN devices, so embodiments operate differently. Instead of transmitting the actual content, an identifier is transmitted, wherein the identifier identifies content already stored on the PAN device.

Additional Embodiments

In some embodiments, wagering game machines can use Sony's "TransferJet" technology to exchange content with PAN devices and other devices. The TransferJet technology is a close proximity wireless transfer technology enabling the high speed transfer of large data files (e.g., photos, HD images, etc.) between wagering game machines and mobile phones, digital cameras, digital video cameras, media players, etc. Using this technology, data can be sent at speeds of 560 Mbps.

Using TransferJet, just touching a wagering game machine with a device triggers an automatic download of media files. TransferJet eliminates complex setup procedures required by some existing wireless systems, and no access point is necessary. Players can register their electronic devices with a wagering game system so wagering game machines and other related devices recognize those devices. By registering devices, wagering game systems can prevent external data leakage.

In some embodiments in which a PAN device includes a Wii Remote™, the Wii Remote can be adapted to include a biometric reader, such as a vein scanner, fingerprint reader, retina scanner, etc. The Wii Remote's biometric reader can authenticate players. If a player's biometric information is authentic, the Wii Remote can provide the player's player identifier to a wagering game machine, thus eliminating a need for the player card. If the player's biometric information is not authentic, the Wii Remote can remain locked.

Example Wagering Game Machines

This section provides more details about wagering game machines.

Figure 7:
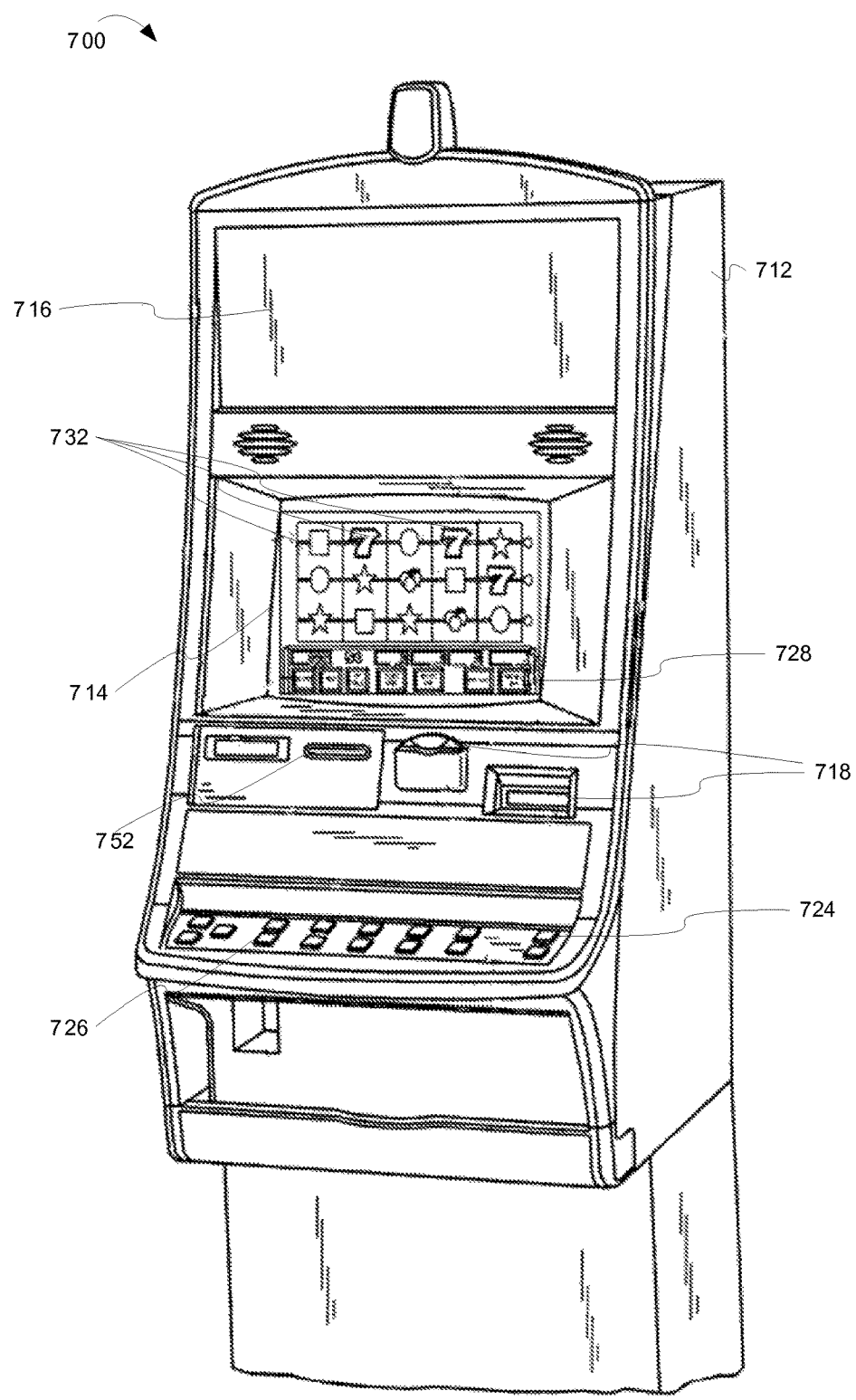
FIG. 7 is a perspective view of a wagering game machine, according to example embodiments of the invention.

FIG. 7 is a perspective view of a wagering game machine, according to example embodiments of the invention. Referring to FIG. 7, a wagering game machine 700 is used in gaming establishments, such as casinos. According to embodiments, the wagering game machine 700 can be any type of wagering game machine and can have varying structures and methods of operation. For example, the wagering game machine 700 can be an electromechanical wagering game machine configured to play mechanical slots, or it can be an electronic wagering game machine configured to play video casino games, such as blackjack, slots, keno, poker, blackjack, roulette, etc.

The wagering game machine 700 comprises a housing 712 and includes input devices, including value input devices 718 and a player input device 724. For output, the wagering game machine 700 includes a primary display 714 for displaying information about a basic wagering game. The primary display 714 can also display information about a bonus wagering game and a progressive wagering game. The wagering game machine 700 also includes a secondary display 716 for displaying wagering game events, wagering game outcomes, and/or signage information. While some components of the wagering game machine 700 are described herein, numerous other elements can exist and can be used in any number or combination to create varying forms of the wagering game machine 700.

The value input devices 718 can take any suitable form and can be located on the front of the housing 712. The value input devices 718 can receive currency and/or credits inserted by a player. The value input devices 718 can include coin acceptors for receiving coin currency and bill acceptors for receiving paper currency. Furthermore, the value input devices 718 can include ticket readers or barcode scanners for reading information stored on vouchers, cards, or other tangible portable storage devices. The vouchers or cards can authorize access to central accounts, which can transfer money to the wagering game machine 700.

The player input device 724 comprises a plurality of push buttons on a button panel 726 for operating the wagering game machine 700. In addition, or alternatively, the player input device 724 can comprise a touch screen 728 mounted over the primary display 714 and/or secondary display 716.

The various components of the wagering game machine 700 can be connected directly to, or contained within, the housing 712. Alternatively, some of the wagering game machine's components can be located outside of the housing 712, while being communicatively coupled with the wagering game machine 700 using any suitable wired or wireless communication technology.

The operation of the basic wagering game can be displayed to the player on the primary display 714. The primary display 714 can also display a bonus game associated with the basic wagering game. The primary display 714 can include a cathode ray tube (CRT), a high resolution liquid crystal display (LCD), a plasma display, light emitting diodes (LEDs), or any other type of display suitable for use in the wagering game machine 700. Alternatively, the primary display 714 can include a number of mechanical reels to display the outcome. In FIG. 7, the wagering game machine 700 is an "upright" version in which the primary display 714 is oriented vertically relative to the player. Alternatively, the wagering game machine can be a "slant-top" version in which the primary display 714 is slanted at about a thirty-degree angle toward the player of the wagering game machine 700. In yet another embodiment, the wagering game machine 700 can exhibit any suitable form factor, such as a free standing model, bartop model, mobile handheld model, or workstation console model.

A player begins playing a basic wagering game by making a wager via the value input device 718. The player can initiate play by using the player input device's buttons or touch screen 728. The basic game can include arranging a plurality of symbols along a payline 732, which indicates one or more outcomes of the basic game. Such outcomes can be randomly selected in response to player input. At least one of the outcomes, which can include any variation or combination of symbols, can trigger a bonus game.

In some embodiments, the wagering game machine 700 can also include an information reader 752, which can include a card reader, ticket reader, bar code scanner, RFID transceiver, or computer readable storage medium interface. In some embodiments, the information reader 752 can be used to award complimentary services, restore game assets, track player habits, etc.

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims. Each of the embodiments is contemplated as falling within the inventive subject matter, which is set forth in the following claims.

The invention claimed is:

1. A method for establishing Bluetooth™ pairing relationships between a Bluetooth enabled device and wagering game machines of a wagering game network, the method comprising:
   receiving, by a first wagering game machine, a player identifier and a personal identification (PIN) number necessary for pairing the Bluetooth enabled device with the wagering game machines of the wagering game network;
   storing the PIN in association with the player identifier;
   pairing the Bluetooth enabled device to a second wagering game machine using the PIN stored in association with the player identifier, the pairing including
      receiving, via a player input device of the second wagering game machine, the player identifier;
      detecting, via a Bluetooth interface of the second wagering game machine, the Bluetooth enabled device;
      in response to the detecting, performing a Bluetooth protocol pairing process to enable Bluetooth protocol communications between the second wagering game machine and the Bluetooth enabled device, the performing including
         requesting, over a communications network, the PIN that has been stored in association with the player identifier;
         receiving, over the communications network, the PIN;
         generating, by the second wagering game machine, a first encryption key based on the PIN;
         receiving, from the Bluetooth enabled device, a second encryption key that was created based at least in part on the PIN;
         authenticating the Bluetooth enabled device based at least in part on the first and second encryption keys;
   presenting results of a wagering game on the second wagering game machine; and
   after the Bluetooth protocol pairing process, transmitting, via the Bluetooth protocol communications, data indicating the results to the Bluetooth enabled device.

2. The method of claim 1, wherein the receiving the player identifier occurs without communications between the second wagering game machine and the Bluetooth enabled device.

3. The method of claim 1, wherein determining the PIN includes procuring the PIN from a repository remote from the second wagering game machine.

4. The method of claim 1 further comprising:
transmitting, to the Bluetooth enabled device, an award associated with the wagering game, wherein the award includes media content presentable on the Bluetooth enabled device.

5. The method of claim 1 further comprising:
detecting, by the second wagering game machine via one or more electronic input devices, a physical item associated with a monetary value that establishes a credit balance;
initiating, by the second wagering game machine, the wagering game in response to an input indicative of a wager covered by the credit balance.

6. The method of claim 1, wherein the Bluetooth enabled device is one of a wireless headset, personal digital assistant, or Nintendo® Wii Remote.

7. One or more non-transitory machine-readable storage media having instructions stored therein that when executed by one or more processors cause the one or more processors to perform operations for establishing a Bluetooth® pairing relationship between a wagering game machine and a Bluetooth enabled mobile device for communicating via Bluetooth protocol, the instructions comprising:
instructions to receive a personal identification number (PIN) and player identifier from a first a first wagering game machine; instructions to store the PIN in association with the player identifier; instructions to receive, at a second wagering game machine via a player input device, the player identifier;
instructions to detect, via a Bluetooth interface of the second wagering game machine, a signal indicating a mobile device;
instructions to cause retrieval of the PIN based on the player identifier, wherein the PIN is for paring the mobile device with the second wagering game machine for conducting encrypted Bluetooth communications; instructions to generate a first encryption key based at least in part on the PIN; instructions to receive, from the mobile device, a second encryption key; instructions to authenticate the mobile device based at least in part on the first and second encryption keys;
instructions to establish, by the second wagering game machine, the encrypted Blue-tooth communications with the mobile device;
instructions to transmit, to the mobile device, an indication of a result of a wagering game played on the second wagering game machine.

8. The one or more non-transitory machine-readable storage media of claim 7, wherein the database includes a plurality of different PINs and a list of mobile devices and player identifiers associated with each of the plurality of different PINs.

9. The one or more non-transitory machine-readable storage media of claim 7, wherein the instructions further include:
instructions to detect, by the second wagering game machine via at least one of the one or more electronic input devices, a physical item associated with a monetary value that establishes a credit balance;
instructions to initiate, by the second wagering game machine, the wagering game in response to an input indicative of a wager covered by the credit balance.

10. The one or more non-transitory machine-readable storage media of claim 7, the instructions further comprising:
instructions to request, from the mobile device, the second encryption key.

11. The one or more non-transitory machine readable media of claim 7, wherein the result of the wagering game includes a free media download award, the instructions further comprising:
instructions to transmit, via the communications network to the mobile device, a uniform resource locator selectable to obtain the free media download.

12. A wagering game system comprising:
a first wagering game machine including
one or more electronic input devices configured to receive a player identifier and a personal identification number (PIN) for Bluetooth paring a mobile device with the first wagering game machine;
storing the PIN in a database remote from the first wagering game machine;
a second wagering game machine including
a value input device configured to detect a physical item associated with a monetary value that establishes a credit balance;
a wagering game unit configured to initiate the casino wagering game in response to an input indicative of a wager covered by the credit balance;
a machine-readable medium including instructions executable on at least one processor, the instructions including:
instructions to receive, via the one or more input devices, the player identifier;
instructions to detect that the mobile device is in proximity to the wagering game machine;
instructions to receive the personal identification number (PIN) from the database, wherein the PIN is for use in paring the mobile device with the wagering game machine for conducting Bluetooth communications with the mobile device;
instructions to generate a first encryption key based on the PIN;
instructions to receive, from the mobile device, a second encryption key that was created based on the PIN;
instructions to authenticate the mobile device based at least in part on the first and second encryption keys;
instructions to establish, by the wagering game machine, the Bluetooth communications with the mobile device;
instructions to transmit, to the mobile device via a Bluetooth communication, an indication of a result of the wagering game.

13. The wagering game machine of claim 12, wherein the selection of the PIN occurs automatically without player input.

14. The wagering game machine of claim 12, the instructions further including:
instructions to request, from the mobile device, the second encryption key.

15. The wagering game machine of claim 12, wherein the result of the wagering game includes a free media download award, the instructions further comprising:
instructions to transmit, to the mobile device, a uniform resource locator selectable to obtain the free media download.

* * * * *